United States Patent Office 3,305,507
Patented Feb. 21, 1967

3,305,507
WATERPROOFING $C_{16-34}$ ALPHA-OLEFIN
POLYMER COMPOSITION
Roy A. White, Somers, and Rudolph D. Deanin, West Hartford, Conn., assignors to Ethyl Corporation, New York, N.Y., a corporation of Virginia
No Drawing. Filed Mar. 28, 1963, Ser. No. 268,570
14 Claims. (Cl. 260—29.6)

This invention relates to compositions adapted for use as waterproofing agents for fibrous materials such as paper and cloth. This invention further relates to process of applying these compositions to the fibrous material.

The requirements of waterproofing agents are numerous and complex. The foremost requirement is, of course, that the waterproofing agent render the fibrous material essentially impervious to the passage of water. The waterproofing agent should have properties that will not cause discoloration of the fibrous material either when applied to the material or upon aging. The waterproofing agent must also be resistant to washing and dry cleaning. Furthermore, the treatment process must not have a deleterious effect on the fibrous substance treated.

It is therefore an object of this invention to provide as novel compositions fibrous material substantially impervious to the passage of water. It is a further object to provide coated articles which are resistant to washing and dry cleaning. It is still a further object to provide novel compositions of matter which when applied to a fibrous material render said material essentially impervious to the passage of water without having a deleterious effect on the material coated. It is still a further object of the present invention to provide novel processes by which these compositions of matter may be applied to said material. The above and other objects will become apparent from the ensuing description.

The above and other objects are fulfilled by the provision of a composition comprising fibrous substrate substantially covered with a layer of a polymer of an alpha olefinic hydrocarbon having a molecular weight of at least about 1000 and being further characterized by having in the monomer molecule from about 16 to about 34 carbon atoms.

A further embodiment of the present invention is a composition adapted for use as a waterproofing agent for fibrous materials consisting essentially of (1) a polymer of an alpha olefinic hydrocarbon having a molecular weight of at least about 1000 and having in the monomer molecule from about 16 to about 34 carbon atoms; (2) an inert organic diluent having a boiling point of from about 20° C. up to about 300° C. and a melting point of below about 20° C.; and (3) a cross-linking catalyst. The cross-linking catalyst is characterized by being substantially inert to both the polymer and the diluent at room temperature. The catalyst is generally employed in an amount ranging from about 0.001 up to about 10.0 weight percent based on the total weight of the ingredients and the amount of polymer employed in the diluent generally ranges from about 0.1 up to about 10 weight percent based on the diluent.

Another embodiment of the present invention is an emulsion adapted for use as a waterproofing agent for fibrous materials consisting essentially of a polymer of an alpha olefinic hydrocarbon having a molecular weight of at least about 1000 and having in the monomer molecule from about 16 to about 34 carbon atoms; water; and a wetting agent. The wetting agent is generally employed in a concentration of from about 0.1 up to about 10 percent based on the weight of the polymer. The concentration of polymer generally ranges from about 0.1 to about 50 weight percent based on the total weight of the emulsion.

In some instances an inert diluent as described hereinbefore may be used in the emulsion. When the diluent is employed the ratio of diluent to water ranges from about 0.1:1 to about 4:1 and preferably from about 0.2:1 to about 0.3:1. In some instances, a cross-linking catalyst as described above may be employed in amounts ranging from about 0.001 up to about 10.0 weight percent based on the polymer.

A further embodiment of the present invention is the process of applying a composition adapted for use as a waterproofing agent for fibrous materials consisting essentially of a polymer of an alpha olefinic hydrocarbon as described above, an inert organic diluent and a cross-linking agent comprising the steps of applying said composition to the surface of the substance to be waterproofed, drying said material to remove excess diluent and thereafter heating the treated fibrous material to cross-link the polymer deposited thereon.

The fibrous materials which form an element of the present invention include cloth, canvas, paper cartons, krafts, leather, paper and paperboard, paper stock, rope and the like. Typical examples of the fibrous materials include cotton, wool, rayon, dacron, nylon, cotton duck, canvas, kraft paper including cement bag stock, paper railroad car liners, heavy kraft wrappings and the like.

The polymer of the alpha olefinic hydrocarbon is further characterized by generally having a molecular weight of from about 500 up to about 1,000,000. It is preferable that the polymer have a molecular weight of from about 1000 up to about 50,000. Within these preferred molecular weight ranges, excellent water repellancy is experienced, coupled with easy application of the polymer to the fibrous material.

These molecular weight ranges may also be expressed in terms of inherent viscosity. The inherent viscosity of the polymer will generally range from about 0.1 up to about 5.0. The preferred inherent viscosity ranges from about 0.5 up to about 2.5.

The polymeric olefin is further defined as being derived from an olefinic monomer having from about 16 up to about 34 carbon atoms. The vinyl or alpha olefinic monomer generally has the formula

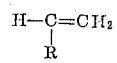

wherein R is an alkyl group having from about 14 up to about 32 carbon atoms. The monomer may either be in an essentially pure state or a mixture of monomers. In some instances olefins having beta branches may be present in which instance the number of carbon atoms in the monomer will remain the same, i.e., 16–34. It is preferable that the terminal monoolefinic hydrocarbon have from about 18 to about 32 carbon atoms since polymers derived therefrom when admixed with a diluent exhibit excellent waterproofing properties. It is most particularly preferred that the olefin monomer be either octadecene-1 or a mixture of alpha olefins having from 18 to about 32 carbon atoms. These particularly preferred olefins are economical, easily obtained and give excellent results as a waterproofing agent.

Typical examples of the alpha olefins employed in the present invention are hexadecene-1, heptadecene-1, octadecene-1, nonadecene-1, eicoscene-1, heneicoscene-1, dococene-1, tricocene-1, tetracocene-1, pentacocene-1, hexacocene-1, heptacocene-1, octacocene-1, nonacocene-1, triacontacene-1, hentriacontacene-1, dotriacontacene-1, tritriacontacene-1, tetratriacontacene - 1, 2 - ethylhexadecene-1, 2-ethyl-octadecene-1, 2-methyl-octadecene-1, 2-ethyldococene-1, 2-butyl-octadecene-1, 2-ethyl - tricontacene-1, and the like.

The term mixtures as used hereinabove may be defined as physical mixtures of two or more terminal monoolefinic hydrocarbons having from about 16 up to about 34 carbon atoms so long as at least two of the olefins differ from each other in carbon content by at least one and preferably two carbon atoms. Typical examples of these olefin mixtures are: two component systems such as hexadecene-1 and octadecene-1; three component systems such as octadecene-1, eicoscene-1, and dococene-1; four component systems such as octadecene-1, dococene-1, tetracocene-1, and hexacocene-1. Other systems comprising a mixture of 5 through 18 different olefins including beta branched olefins are within the ambit of this invention.

The preferred mixture of olefins having as components thereof is the mixture comprising olefins spanning the range of from 18 carbon atoms up to 32 carbon atoms, i.e., octadecene-1, nonadecene-1, eicoscene-1, heneicoscene-1, dococene-1, tricocene-1, tetracocene-1, pentacocene-1, hexacocene-1, heptacocene-1, octacocene-1, nonacocene-1, triacontacene-1, hentriacontacene-1, and dotriacontacene-1. This mixture of alpha olefins may vary over a wide latitude. For example, the olefins with the even number of carbon atoms are generally much in predominance comprising from about 90 to about 100 percent of the mixture. However, in many instances equal weight percentages of each of the olefins may be present including beta branched olefins.

The most particularly preferred mixture of olefins are those in which each have an even number of carbon atoms, the individual alpha olefinic hydrocarbons differ in carbon content predominantly in increments of two. Thus, the particularly preferred mixture of terminal monoolefinic hydrocarbons comprises octadecene-1, eicoscene-1, dococene-1, tetracocene-1, hexacocene-1, octacocene-1, triacontacene-1, and dotriacontacene-1. The percentages of the respective olefins present in the preferred mixture are subject to wide variation. Generally, the octadecene is the predominate olefin present and constitutes from about 20 percent to about 80 percent of the mixture with the remainder being the other olefins in various amounts.

The olefins described hereinabove may be obtained by any general prior art chain growth process. They may also be obtained through modern refinery techniques. One such chain growth technique is set forth in U.S. Patent 2,699,457 to Ziegler issued January 11, 1955.

The alpha olefins are generally polymerized by the use of a catalyst system consisting of an alkyl aluminum compound and a salt of a refractory metal. An example of this catalyst is triethyl aluminum and titanium tetrachloride. Generally the temperature may vary from about 0°–150° C. and at a pressure of from about atmospheric up to about 100 atmospheres. One general technique which may be employed is set forth by C. S. Marvel in the Journal of Polymer Science No. 152, pp. 335–353 (1961). The Marvel article described polymerizing octadecene-1 employing as the catalyst triisobutyl aluminum and titanium tetrachloride in a normal heptane solution. The ratio of triisobutyl aluminum to titanium ranged from about 1:1 down to about 0.8:3. The percent conversion of polyoctadecene ranged up to 100 percent.

Although not desiring to be bound by theoretical considerations, it is believed that the long chain alpha olefin monomers are polymerized into polymers having long side chains such as

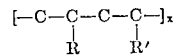

wherein R and R' are alkyl chains which may be the same or different each having from about 14 to about 32 carbon atoms. It is believed that these side chains in the polymer are the determining factor in the beneficial waterproofing properties observed.

As stated hereinabove the inert organic diluent is generally characterized by having boiling point from about 20° C. up to about 300° C. The diluents may still be further characterized as hydrocarbon diluents having up to about 16 carbon atoms. The hydrocarbon diluents may be aliphatic, cycloaliphatic, aromatic or halogenated derivatives of these. In many instances, ethers, ketones, and hydrocarbon mixtures, e.g., kerosene may be employed. The type of diluent used generally depends on the particular object being coated with the waterproofing agent. In other words, the type of solvent or diluent employed should be inert to the object coated. Acetone, for example, would not be employed as a diluent where the fibrous object is soluble therein.

The concentration of polymer in diluent generally ranges from about 0.01 up to about 50 percent by weight based on the diluent. It is preferable that the concentraton of polymer in the diluent be from about 1 up to about 25 weight percent since excellent waterproofing results are obtained with this concentration.

The wetting agent or surface active agent which may be employed may vary over a wide range depending on the particular substances being waterproofed. The effect of the wetting agent is to lower the surface or interfacial tension and effect solubilization of normally insoluble substances into thermodynamically stable solution. Wetting as referred to here includes and means penetration or spreading on the polymer of the particular material to be waterproofed. Thus, the structure of the fabric or particular material to be waterproofed is largely a determining factor as to whether a wetting agent in addition to the normal organic diluent should be used. Generally, various organic liquids will be sufficient to penetrate the cloth. However, additional surface active agents or boosting solvents which may be termed penetrating agents may be employed. Typical general examples of these penetrating agents are soaps, sulfonates, aliphatic ketones, ethers, alcohols, halogenated hydrocarbons, such as perchloroethylene and trichloroethylene, esters and the like.

The curing of the waterproofing agent of this invention may be achieved by employing any general prior art free radical catalyst which is characterized by being essentially inert at room temperature. Organic peroxides are an excellent example of commercially available free radical curing agents or catalysts. These peroxides may generally be exemplified by the formula

wherein R and R' are alkyl, acyl or hydrogen radicals. The only prerequisite of free radical catalyst employed in this invention is that they be inert under normal conditions until curing is effected by heat, radiation or the like. Typical examples of free radical peroxide catalysts are as follows: benzoyl peroxide, dichlorobenzoyl peroxide, lauroyl peroxide azo-bis-iso-butyronitrile, tetra-n-butyl orthotitanate and the like.

Irradiation may also be employed as a technique for cross-linking the polymer coating. A typical source of radiation would be cobalt 60.

As stated hereinabove the cross-linking catalyst is essentially inert at room temperature. Thus, activation of the cross-linking catalyst is achieved by heating the mixture after it has been applied to the cloth. The temperature generally required will vary from about 100° F.

up to about 450° F. It is preferred, however, that the temperature range from about 150° F. up to about 350° F. since excellent cross-linking is achieved within this temperature span.

The time of the heat treatment can generally vary from about 1 minute up to about 48 hours depending on the catalyst employed and temperature used. Generally, it is satisfactory to use the heat treatment from about 5 minutes up to about 10 hours since good cross-linking is achieved within this time range.

The cross-linking is employed when it is desirable to have a high degree of permanence of waterproofing. Where no permanence is required, i.e., no resistance to washing or dry cleaning, the polymer in inert organic diluent may be applied to the fibrous material.

The advantages of the compositions of this invention are many in number. Among these advantageous features are permanence after dry cleaning when the waterproofing agent is applied to cloth; no adverse effect on the tensile strength of the material waterproofed and no discoloration to the material. Furthermore, unlike the paraffin type waterproofing agents, the compositions of this invention do not crack or buckle from the fibrous material when wrinkled or bent. Over and above these features is the fact that the waterproofing agents of this invention are extremely economical.

These novel compositions and the processes by which they may be used will be better understood from the following examples. In all of the examples are parts by weight unless otherwise specified.

EXAMPLE I

*Preparation of the polymer.*—Essentially pure octadecene-1 (20 parts) was added to a reactor equipped with a high speed stirrer and containing 1.3 parts of n-heptane. 3.5 parts per hundred of triisobutyl aluminum and 1.1 parts per hundred of titanium tetrachloride were mixed and added to the reaction mixture. The reaction mixture was stirred for 48 hours at room temperature after which the resultant polymer, polyoctadecene, was washed with methyl alcohol. The resultant polyoctadecene was obtained in about 82.6 percent yield.

EXAMPLE II

*Preparation of polymer.*—Ten (10) parts of a mixture of alpha olefins having the composition comprising about 50% octadecene-1
20% eicoscene-1
10% dococene-1
7% tetracocene-1
5% hexacocene-1
3% octacocene-1
3% triacontacene-1
2% dotriacontacene-1 was added to a reaction vessel equipped with a high speed stirrer and containing 25.4 parts of heptane. To this mixture was added 0.18 parts per hundred of triethyl aluminum and 0.07 parts per hundred of titanium tetrachloride. The mixture was maintained at a temperature of 40–45° C. at atmospheric pressure with stirring for 68 hours. After this reaction period the polymeric product was washed with methanol. The polymer of the olefinic mixture of $C_{18}$–$C_{32}$ was obtained in an 82 percent yield and had an inherent viscosity of 1.2.

EXAMPLE III

Three solutions of the polymer produced in Example II were compounded each consisting essentially of (a) 90 percent by volume xylene, 10 percent by volume ethanol and 1 percent by weight of the $C_{18}$–$C_{32}$ polymer, (b) 90 percent by volume xylene, 10 percent volume ethanol and 2 percent by weight of $C_{18}$–$C_{32}$ polymer, and (c) 90 percent by volume of xylene, 10 percent by volume of ethanol and 3.8 percent of the $C_{18}$–$C_{32}$ polymer. Two additional solutions were made up each containing 10 percent of the polymer. To each of these polymer solutions was added three parts per hundred of benzoyl peroxide. Each solution was applied to muslin cloth, dried at room temperature and cured at 300° F. Each of these cloth samples were evaluated for waterproofing by (a) observing a drop of water on the surface of the cloth, and (b) measuring the height of a column of water that was required to leak through the cloth. After this test the cloth was then treated with trichloroethylene for four hours in a Soxhlet extractor. After this treatment the cloth was further treated with Stoddard solvent which is understood to be a petroleum distillate and is a commercial dry cleaning agent containing a detergent (described in the Condensed Chemical Dictionary, 6th edition, at page 1077). After these successive treatments, the waterproofing evaluation was repeated, i.e., measuring the height of a column of water that was required to leak through the cloth. The results of these most stringent tests are set forth by the data shown in Table I.

TABLE I

| | Run 1 | Run 2 | Run 3 | Run 4 | Run 5 |
| --- | --- | --- | --- | --- | --- |
| Polymer Solution, percent | 1 | 2 | 3.8 | 10 | 10 |
| Benzoyl Peroxide, PHR | 3 | 3 | 3.1 | 3 | 3 |
| Cure Time, Minutes/300° F | 30 | 30 | 30 | 20 | 20 |
| Waterproofing Before Extraction and Dry Cleaning: | | | | | |
| Drop of Water | G | E | E | E | E |
| Height of Water, cm | 10.5 | 8 | 8 | | |
| Waterproofing After Extraction and Dry Cleaning: Height of Water, cm | 5.5 | 10.5 | 1 | 2 | 2 |

G=Good, little or no penetration.  E=Excellent, no penetration.

As noted from the data in Table I these waterproofing compositions made all of the cloths quite waterproofed and furthermore after the stringent cleaning action by the various solvents the cloths resisted extraction by the dry cleaning agents.

It should also be noted that similar excellent results are obtained when octadecene-1, nonadecene-1, heneicoscene-1, tricocene-1, heptacocene-1, nonacocene-1, hentriacocene-1 and the like are employed.

Other solvents or diluents which may be used in lieu of the xylene ethanol compositions are benzene, trichloroethylene, perchloroethylene and the like. Other two component compositions which may be employed are diethyl ether and benzene; diisopropyl ketone and trichlorobenzene; toluene and isopropyl alcohol and the like.

Similar excellent cross-linking is obtained when irradiation from cobalt 60 is employed as the means for cross-linking the polymer.

EXAMPLE IV

The process of Example III was repeated with the exception that all solutions contained 3.8 percent of $C_{18}$–$C_{32}$ polymer and various concentrations of benzoyl peroxides were employed. As in Example III, muslin cloth was treated by the various solutions, dried at room temperature, cured from 5 to 30 minutes at 200–300° F. and thereafter evaluated for waterproofing. The data in Table II demonstrates the results obtained by these various experiments.

TABLE II

| | Run 1 | Run 2 | Run 3 | Run 4 | Run 5 |
|---|---|---|---|---|---|
| Benzoyl Peroxide, PHR | 0.39 | 0.75 | 1.48 | 3.1 | 3.1 |
| Weight Gain of Cloth, percent | 3.8 | 4 | 4 | | |
| Cure Temperature, °F | 300 | 300 | 300 | 300 | 300 |
| Cure Time, Minutes | 30 | 30 | 30 | 20 | 30 |
| Drop of Water | E | E | E | E | E |
| Height of Water, cm | 9 | 10 | 30 | 12 | 8 |

E = Excellent, no penetration.

Similar excellent results are obtained when other curing agents are employed, typical of which are cumene hydroperoxide, cyclohexanone peroxide, tert-butyl peroxide isobutyrate and the like.

EXAMPLE V

In this series of experiments 3.8 percent of purified $C_{18}$–$C_{32}$ polymer was mixed with 90 percent xylene and 10 percent ethanol. To this polymer solution was added various concentrations of curing agents. Strips of muslin cloth were treated separately with each of the solutions of the various curing agents. The cloth samples were dried at room temperature and then cured under various conditions and evaluated for waterproofing and permanence. The data in Table III demonstrates the various curing agents employed, their concentrations, cure temperature and cure time.

polymer. An emulsion was also made consisting of 5 parts of the $C_{18}$–$C_{32}$ polymer, 90 parts of perchloroethylene, 160 parts of water, 1.2 parts of oleic acid, and 0.3 part of morpholine and 0.15 part of benzoyl peroxide.

These three mixtures were individually applied to cotton raincoat fabric and thereafter dried. The drying was achieved by two techniques, drip drying or centrifuging. The cloths were further dried at 140° F. and thereafter cured at 300° F. for 30 minutes. The samples were tested for water repellent properties. The evaluation test was the same as that set forth in Example III, i.e., observing a drop of water on the surface of the cloth and measuring the height of a column of water that was required to leak through the cloth. The results of these tests are set forth in the data of Table IV.

TABLE IV

| | Solution or Emulsion | | | | | |
|---|---|---|---|---|---|---|
| | Perchloro-ethylene | | Stoddard Solvent | | Emulsion | |
| Method of Drying | Drip | Cent. | Drip | Cent. | Drip | Cent. |
| Waterproofing Before Dry Cleaning: Height of Water, cm | 17.5 | 17 | 15 | 15 | 3 | 2 |

Similar excellent results are obtained when other solvents are employed such as hexane, heptane, 1-chloropentane, trichlorobenzene, 1,4-dioxane, methyl isobutyl ketone, diethylene glycol monomethyl ether, butyl acetate, ethyl acetate and the like. These solvents may also be compounded with boosting solvents to increase the wetting power or the penetration of the polymer in the material being treated. Typical examples of these penetrating agents are cetyl sodium sulphonate, the sodium sulfate of lauryl alcohol, the polyoxyethylene ether of lauryl alcohol and the like.

TABLE III

| | Curing Agent | | | | | | | | | | | |
|---|---|---|---|---|---|---|---|---|---|---|---|---|
| | Dichloro-Benzoyl Peroxide | | | Lauroyl Peroxide | | | Methyl Ethyl Ketone Peroxide | | | Azo-Bis-Isobutyro-Nitrile | | |
| Run | A | B | C | A | B | C | A | B | C | A | B | C |
| Concentration, PHR | 3.1 | | | 3.1 | | | 3.1 | | | 3.1 | | |
| Cure Temperature, °F | 200 | 250 | 300 | 200 | 250 | 300 | 200 | 250 | 300 | 200 | 250 | 300 |
| Cure Time, Minutes | 30 | | | 30 | | | 30 | | | 30 | | |
| Waterproofing Before Extraction and Dry Cleaning: | | | | | | | | | | | | |
| Drop of Water | E | E | E | E | E | E | E | E | E | E | E | E |
| Height of Water, cm | 9 | 12 | 13 | 7.5 | 10 | 8 | 10 | 11 | 8 | 11 | 12 | 5 |
| Waterproofing After Extraction and Dry Cleaning: | | | | | | | | | | | | |
| Drop of Water | E | E | E | E | E | E | E | E | E | E | E | E |
| Height of Water, cm | 1 | 1 | 15 | 2 | 2 | 2 | 1 | 2 | 3 | 1 | 1 | 7.5 |

E = Excellent, no penetration.

EXAMPLE VI

The $C_{18}$–$C_{32}$ polymer of Example II (2 parts) was added to 100 parts of perchloroethylene containing 3 parts per hundred of resin of benzoyl peroxide. A second solution was made consisting of 100 parts of Stoddard solvent (which is understood to be a naphtha mixture), 2 percent of the polymeric mixture of Example II, and 3 parts per hundred of benzoyl peroxide based on the

Comparative Example A

The $C_{18}$–$C_{32}$ polymer of Example II (3.8 percent) was compounded with 90 percent by volume of xylene containing 3 parts per hundred of benzoyl peroxide based on the polymer. Several commercially available waterproofing agents labeled I–V, respectively, were compared with the $C_{18}$–$C_{32}$ waterproofing agent of this invention. Individual cloth specimens were treated with the respective waterproofing agents. A drop of water was then placed on each of the cloth specimens to see if water permeated the material. Thereafter the cloth was tested by measuring the height of a column of water required to leak through the cloth. Results of this comparative test are set forth in Table V.

laminated to commonly available writing paper (3.0 mils thick) by pressing the sheet of paper against the polyethylene at 10 p.s.i. at 280° F.

Commonly available writing paper (3.0 mils thick) was treated with the solutions of A and B above and dried. The solution containing the peroxide cross-linking agent was cured for 30 minutes at 300° F. Each of the specimens above was tested for tensile strength at 73° F. at 50 percent relative humidity. Thereafter each of the specimens was soaked in water for two hours at 70° F. and again tested for tensile strength.

TABLE V

|  | $C_{18}$–$C_{32}$ Polymer of This Invention | I | II | III | IV | V |
|---|---|---|---|---|---|---|
| Form | 100% | 38% Paste | 40% Solution Paste | 36% Solution Paste | 100% | 100%. |
| Type of Dilution | Solution | Emulsion | Solution | Solution | Solution | Solution. |
| Active Ingredients after Dilution, percent | 4 | 2.6 | 6.7 | 6 | 4 | 4. |
| Catalyst | Benzoyl Peroxide | | | | | |
| Amount of Catalyst, PHR | 3.0 | | | | | |
| Cure Temperature, ° F | 300 | | | | | |
| Cure Time, Min | 30 | | | | | |
| Waterproofing Before Extraction and Dry Cleaning: | | | | | | |
| Drop of Water | E | G | E | G | F | G. |
| Height of Water, cm | 30 | 6 | 19 | 5.5 | 2 | 6.7. |
| Waterproofing After Extraction and Dry Cleaning: | | | | | | |
| Drop of Water | E | G | G | P | P | F. |
| Height of Water, cm | 17 | 10.5 | 7 | 3 | 4 | 1. |

I—A commercially available aluminum compound wax mixture as set forth in the Condensed Chemical Dictionary, 6th Edition, p. 104. II—A commercially available polymer wax mixture. III—A commercially available polymer wax mixture different from C. IV—A poly dimethyl siloxane as disclosed in the Condensed Chemical Dictionary, 6th Edition, p. 418. V—A wax like amide consisting essentially of stearyl amide as disclosed in the Condensed Chemical Dictionary, 6th Edition, p. 107.

E=Excellent, no penetration. F=Fails, water penetrates. G=Good, little or no penetration. P=Poor, some penetration.

As noted from comparative example the waterproofing agents of this invention are comparative to or superior to commercially available waterproofing agents available on the market today. The compositions of this invention render the cloth specimen waterproofed even after dry cleaning.

EXAMPLE VII

In this run, polyoctadecene in the same manner as set forth in Example I (5 weight percent), was added to 100 parts of benzene. A cloth composed of nylon and acrylic fiber (50/50) is treated with the polymer solution. The excess solution is removed from the cloth specimen. The specimen is then dried. A drop of water is placed on the cloth to see if the water penetrated. Excellent results are experienced when this technique is employed where no permanence toward dry cleaning is required.

This technique may also be applied when substrate is paper, kraft, cotton duck, nylon, mixtures of synthetic fibers and the like.

EXAMPLE VIII

A solution of percent polyoctadecene and benzene containing no cross-linking catalysts was made up. Cotton cloth was treated with the solution and thereafter dried. A drop of water was placed on the cloth and no penetration was observed. The cloth specimen supported a column of water 10 cm. high before any leakage or penetration was observed. No brittleness was observed in the specimen which was capable of being bent or twisted without cracking.

EXAMPLE IX

Separate solutions were made up as follows:
(A) A 5 percent solution of polyoctadecene and benzene containing 4 parts per hundred of dicumyl peroxide, based on the polymer.
(B) A 6 percent benzene solution of paraffin.
(C) A thin layer of polyethylene (0.4 mil) was The results of each of these tests are set forth in the data in Table VI.

TABLE VI.—WATERPROOFING PAPER

| Paper Treatment | Dry Tensile Strength [1] at 73° F. and 50% R.H. | Wet Tensile Strength [1] Immediately After Soaking in Water 2 Hrs. at 73° F. |
|---|---|---|
| None | 6.32±0.4 | (0.15±0.06) |
| 6% Paraffin Solution | 5.60±0.35 | 0.54±0.1 |
| 0.4 Mil Polyethylene Laminated to Paper | 5.30±0.05 | 0.62±0.07 |
| 5% Polyoctadecene Solution Containing 0.2% (4 PHR) of Dicumyl Peroxide; Cured | 5.00±0.08 | 0.95±0.1 |

[1] Break load in pounds for lined pad writing paper 3 mils thick and ¼" wide.

It is noted from the above table that the tensile strength of the paper specimens treated by the compositions of this invention are much superior to paraffin and polyethylene laminated paper.

Diluents which may be employed in conjunction with the polyoctadecene waterproofing agent of this invention are organic diluents having a boiling point of between about 20° C. up to about 200° C. These organic diluents are generally inert to the polymeric materials which have been dissolved therein. It is preferable that the organic diluents employed be hydrocarbon diluents having up to about 16 carbon atoms. The hydrocarbon diluents may be aliphatic, cycloaliphatic, aromatic or halogenated derivatives of these. It is most preferable to employ either aromatic or halogenated hydrocarbons since excellent results are experienced when these diluents are used. Typical examples of the diluents which may be employed in this invention are benzene, toluene, o-xylene, m-xylene, p-xylene, hemimellitene, psuedocumene, mesitylene, isodurene, ethyl benzene, 1,2-diethyl benzene, n-propyl benzene, cumene, n-butyl benzene, t-butyl benzene, p-cymene, allyl benzene, hexane, heptane, octane, nonane, decane, cyclohexane, cycloheptane, methyl cyclohexane, methyl cycloheptane, methyl chloride, carbon tetrachloride, ethyl chloride, methylene chloride, ethylene dichloride, chloroform, dichloroethylene, tetrachloroethane, pentachloroethane, hexachloroethane, trichlorethylene, perchlorethylene, propylene dichloride, 1,1,1-trichloroethane, 1-chloropentane, 1-chlorobutane, bromobenzene, chlorobenzene, dibromobenzene, trichlorobenzene, p-chlorotoluene, o-chlorotoluene, hexene, heptene, octene, decene, alpha dichloroheptene, alpha dibromooctene and the like. Hydrocarbon mixtures may also be employed typical of which are the turpines, naphthas, gasoline, kerosene and the like. Ethers such as dialkylethers, cyclic ethers, glycol ethers and the like may be employed. Typical examples of these ethers are ethyl ether, isopropyl ether, n-butyl ether, diamyl ether, n-hexyl ether, ethylene glycol monomethyl ether, ethylene glycol mono-n-butyl ether, diethylene glycol monomethyl ether, diethylene glycol monoethyl ether, diethylene glycol monobutyl ether, ethylene glycol diethyl ether, ethylene glycol dimethyl ether, ethylene glycol dibutyl ether, 1,4-dioxane, 1,2-propylene oxide, dimethoxymethane, 2-methyl furan, tetrahydrofuran, dihydropyran, tetrahydropyran, 2,2′-dichloroethyl ether and the like. Ketones may also be employed in this invention typical of which are methyl isobutyl ketone, methyl ethyl ketone, methyl-n-propyl ketone, hexanone-2, hexanone-3, methyl-t-butyl ketone, di-n-propyl ketone, diisopropyl ketone, diisobutyl ketone, di-n-amyl ketone, chloroacetone, dichloroacetone, mesityl oxide, cyclohexanone, acetyl acetone and the like. Esters such as butyl acetate, ethyl acetate, lauryl acetate and the like may be employed.

In many instances it is desirable to employ a wetting agent in conjunction with the diluent listed hereinabove. This wetting agent or boosting solvent acts generally as a penetrating agent to lower the surface or interfacial tension and effect solubilization of normally insoluble substances. Typical of these additional wetting agents which may be employed are acetone, methyl ethyl ketone, diethyl ether, dimethyl ether, dibutyl ether, methanol, ethanol, propanol, hexanol, dimethyl ether of diethylene glycol, diethyl ether of diethylene glycol.

Typical examples of surfactants which may be employed in this invention can be found in Organic Chemistry, 3rd edition, by Feiser and Fieser, Reinhold Publishing Company, pp. 410–415; Surface Active Agents by Schwartz and Perry, 1949, Interscience Publishers, Inc., New York; and Surface Active Agents by Anson et al., Annals of the New York Academy of Science, volume XLVI, art. 6, pp. 347–530, 1946. Typical of these surface active agents are the polyoxyethylene ether of lauryl alcohol, polyoxyethylene ether of 1,1,3,3-tetramethyl butyl phenol, dimethyl lauryl-benzyl ammonium chloride, the methasulphate of oleyl amide of diethyl ethylene diamine, cetyl pyridinium chloride, sodium sulphonate of heptadecyl benzimidazole, sodium sulphate of polyoxyethylene ether of 1,1,3,3-tetramethylbutylphenol, sodium sulphonate of polyoxyethylene ether of 1,1,3,3-tetramethylbutylphenol, sodium sulphate of 2-methyl-7-ethyl-undecanol-4, sodium sulphate of 3,9-diethyltridecanol-6, di-(2-ethylbutyl)sodium sulphosuccinate, sodium salt of octyl oleate, sodium salt of octyl isethionate, sodium salt of oleyl amide of N-methyl glycine, sodium salt of the lauric ester of sulpho-acetic acid, the condensation product of oleic acid and degraded protein, octyl benzene sodium sulphonate, diisopropyl naphthalene sodium sulphonate, sodium stearate, cetyl sodium sulphonate, sodium sulphate of lauryl alcohol, sodium sulphate of oleyl alcohol, carboxymethyl cellulose, methyl cellulose, hydroxyethyl cellulose, polyvinyl alcohol, polyvinyl pyrrolidone and the like.

In addition to the above diluents and/or boosting solvents, it is sometimes desirable to employ a commercially available propellent. These propellents would generally be employed when it is desirable to obtain a quick waterproofing coating on a substance without curing or cross-linking of the polymer coating. Typical examples of these propellents are trichloromonofluoromethane, dichlorodifluoromethane, monochlorotrifluoromethane, monobromotrifluoromethane, tetrafluoromethane, monochlorodifluoromethane, dichlorotrifluoroethane, dichlorotetrafluoroethane, octafluorocyclobutane, tetrachlorodifluoroethane, trichlorotrifluoroethane and the like.

Typical examples of cross-linking or curing agents are the free radical catalysts such as 2,4-dichlorobenzoyl peroxide, lauroyl peroxide, caprylyl peroxide, benzoyl peroxide, p-chlorobenzoyl peroxide, hydroxyheptyl peroxide, t-butyl peroxyisobutyrate, cyclohexanone peroxide, methyl ethyl ketone peroxide, t-butyl peracetate, t-butyl perbenzoate, di-t-butyl diperphthalate, dicumyl peroxide, t-butyl hydroperoxide, di-t-butyl peroxide, p-menthane hydroperoxide, pinane hydroperoxide, 2,5-dimethylhexane-2,5-dihydroperoxide, cumene hydroperoxide, cobalt naphthenate, azo-bis-isobutyronitrile and the like. Irradiation is also a means for cross-linking the polymers. Various sources of irradiation may be employed such as cobalt 60 and the like.

Having thus described this invention and the embodiments thereof, it is not desired to be bound except as set forth in the following claims.

What is claimed is:

1. A waterproofing composition for fibrous materials consisting essentially of (1) a polymer of an alpha olefinic hydrocarbon having a molecular weight of at least about 1000 and having in the monomer molecule from about 16 to about 34 carbon atoms; (2) an inert organic diluent having a boiling point of from about 20° C. up to about 300° C. and a melting point of below about 20° C.; and (3) an organic peroxide catalyst, characterized by being substantially inert at room temperature, said catalyst being present in an amount ranging from about 0.001 to about 10.0 weight percent based on a total weight of the ingredients; said polymer being dissolved in said diluent in an amount ranging from about 0.1 to about 50 weight percent based on the diluent.

2. The composition of claim 1 wherein said alpha olefinic hydrocarbon has in the monomer molecule from about 18 to about 34 carbon atoms.

3. The composition of claim 1 wherein said polymer is polyoctadecene.

4. The composition of claim 1 wherein said polymer is derived from an alpha olefinic hydrocarbon mixture having in the monomer molecule from about 16 to about 34 carbon atoms each.

5. The composition of claim 1 wherein said diluent is a chlorinated hydrocarbon.

6. The process of waterproofing a fibrous material with the composition of claim 1 and thereafter heating the treated material to cross-link the polymer.

7. A waterproofing composition for fibrous materials comprising (A) a composition initially consisting essentially of (1) a polymer of an alpha olefinic hydrocarbon having a molecular weight of at least about 1000 and having in the monomer molecule from about 16 to about 34 carbon atoms; (2) an inert organic diluent having a boiling point of from about 20° C. up to about 300° C. and a melting point below about 20° C.; and (3) an organic peroxide catalyst, characterized by being substantially inert at room temperature; said catalyst being present in amount ranging from about 0.001 to about 10.0 weight percent based on a total weight of the ingredients; said polymer being dissolved in said diluent in an amount ranging from about 0.1 to about 50 weight percent based on the diluent; (B) water; and (C) a wetting agent.

8. The composition of claim 7 wherein said polymer is polyoctadecene.

9. The composition of claim 7 wherein said polymer is derived from a mixture of alpha olefinic hydrocarbons containing from about 18 to about 32 carbon atoms.

10. A fibrous substrate substantially covered with a layer of a composition initially consisting essentially of (1) a polymer of an alpha olefinic hydrocarbon having a molecular weight of at least about 1000 and having in the monomer molecule from about 16 to about 34 carbon atoms; (2) an inert organic diluent having a boiling point of from about 20° C. up to about 300° C. and a melting point below about 20° C.; and (3) an organic peroxide catalyst, characterized by being substantially inert at room temperature; said catalyst being present in an amount ranging from about 0.001 to about 10.0 weight percent based on a total weight of the ingredients; said polymer being dissolved in said diluent in an amount ranging from about 0.1 to about 50 weight percent based on the diluent.

11. The composition of claim 10 wherein said polymer is polyoctadecene.

12. The composition of claim 10 wherein said polymer is derived from a mixture of alpha olefinic monomers having from 18 to about 32 carbon atoms.

13. The composition of claim 10 wherein said fibrous substrate is cloth.

14. The composition of claim 10 wherein said fibrous substrate is paper.

References Cited by the Examiner

UNITED STATES PATENTS

| | | | |
|---|---|---|---|
| 2,728,684 | 12/1955 | Darragh | 260—29.6 |
| 2,977,350 | 3/1961 | Fasce et al. | 260—93.7 |

MURRAY TILLMAN, *Primary Examiner.*

SAMUEL H. BLECH, *Examiner.*

J. ZIEGLER, *Assistant Examiner.*